(12) United States Patent
Schuckel (10) Patent No.: US 8,333,367 B2
(45) Date of Patent: Dec. 18, 2012

(54) PNEUMATIC SUSPENSION SPRING FOR A WHEELED VEHICLE

(75) Inventor: David R. Schuckel, New Haven, IN (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 617 days.

(21) Appl. No.: 12/509,969

(22) Filed: Jul. 27, 2009

(65) Prior Publication Data

US 2011/0018180 A1    Jan. 27, 2011

(51) Int. Cl.
*F16F 9/43*      (2006.01)
(52) U.S. Cl. .................................................. 267/64.28
(58) Field of Classification Search ............... 267/64.11, 267/64.13, 64.16, 64.19, 64.21, 64.23, 64.24, 267/64.27, 64.28
See application file for complete search history.

(56) References Cited

U.S. PATENT DOCUMENTS

| | | | |
|---|---|---|---|
| 2,902,291 A * | 9/1959 | Walker | 280/6.159 |
| 2,995,355 A * | 8/1961 | Stump | 267/64.27 |
| 3,044,761 A * | 7/1962 | Davies | 267/64.24 |
| 3,081,075 A * | 3/1963 | Selman | 267/64.24 |
| 5,286,010 A * | 2/1994 | Pahl et al. | 267/64.24 |
| 6,257,561 B1 * | 7/2001 | Nakayama et al. | 267/64.19 |
| 6,416,044 B1 * | 7/2002 | Warinner et al. | 267/64.19 |
| 6,460,836 B1 * | 10/2002 | Trowbridge | 267/64.27 |
| 6,926,264 B1 | 8/2005 | Trowbridge | |
| 6,942,201 B2 * | 9/2005 | Leonard | 267/64.27 |

FOREIGN PATENT DOCUMENTS

JP     04211737 A * 8/1992

* cited by examiner

*Primary Examiner* — Xuan Lan Nguyen
(74) *Attorney, Agent, or Firm* — Jeffrey P. Calfa; Mark C. Bach

(57) ABSTRACT

Various embodiments of an air spring end closure are disclosed. One has an outer part and an inner part joined together to provide a moment of inertia along an axis that is transverse to axial expansion and contraction of the air chamber that is greater than that of the outer part alone. Another has a part that is concave toward the chamber and contains one of a riser and a depression having a generally rectangular shape whose length runs transverse to the direction of expansion and contraction and that is widthwise centered on a diameter of the part. Still another has a part having an elliptical perimeter margin curled onto a similarly shaped axial end of a sleeve that provides the axial expansion and contraction.

11 Claims, 8 Drawing Sheets

PNEUMATIC SUSPENSION SPRING FOR A WHEELED VEHICLE

TECHNICAL FIELD

The general subject matter of this disclosure relates to pneumatic springs that are used as components of suspensions in wheeled vehicles, such as suspensions for axles or bogies in large vehicles, a tractor-trailer being one example of such a vehicle. More particularly, the disclosure relates to top end closures of such springs that provide for attachment of the springs to an underbody of a vehicle, such as to a chassis frame of such a vehicle.

BACKGROUND OF THE DISCLOSURE

An example of a pneumatic spring (sometimes called an air spring because of the common use of air as the medium that fills the spring interior) comprises a top closure, a bottom closure, and a generally cylindrical flexible sleeve or bellows whose opposite ends are closed by the respective closures. The top closure is attached to an underbody component of a vehicle, such as a chassis frame rail or a structural floor rail that may be integrated with the vehicle body. The bottom closure is attached to a suspended component, such as an axle or bogie, containing wheels on which the vehicle travels. While various constructions for sleeves and bellows are known, they share a common characteristic of being gas-impermeable for containing a gas under pressure and retaining their general shape while contracting and expanding with motion of the closures toward and away from each other as the unsprung mass moves toward and away from the sprung mass.

Each closure is sealed to the respective end of the sleeve or bellows in a suitably appropriate fluid-tight manner to create a fluid-tight chamber that can expand and contract in length. The top closure typically contains a port through which a gas, such as air, can be introduced into or vented from the closed interior of the spring to set a suitable interior pressure.

It is known to fabricate closures from various materials that include metals and synthetics.

SUMMARY OF THE DISCLOSURE

The present disclosure relates to top closures of air springs that possess increased rigidity that allow an air spring to be fastened to a frame rail or other structural component of a sprung mass without additional external reinforcements, such as additional external brackets and/or plates for fastening the spring to the sprung mass.

The disclosed closures have increased cross sectional moments of inertia in certain planes by imparting an arch, cone, or domed shape to them for reducing the tensile loads and stresses in the closure material.

The closures may comprise any of various materials such as metals, plastics, composites, etc. and may be fabricated by any of various manufacturing processes (stamping, forming, molding, etc.).

A general aspect of this disclosure relates to a pneumatic spring comprising a pneumatic chamber comprising a cylindrical wall that is expansible and contractible along an axial direction and closed at opposite axial ends by respective closures, one of the respective closures comprising an outer part and an inner part joined to the outer part to endow the one of the respective closures with a moment of inertia along an axis transverse to the axial direction that is greater than that of the outer part alone.

Another general aspect relates to a pneumatic spring a pneumatic chamber comprising a cylindrical wall that is expansible and contractible along an axial direction and closed at opposite axial ends by respective closures, one of the respective closures comprising a part that is concave toward the pneumatic chamber and that comprises one of a riser and a depression having a generally rectangular shape whose length runs transverse to the axial direction and that is widthwise centered on a diameter of the part.

Another general aspect relates to a pneumatic spring comprising a pneumatic chamber comprising a cylindrical wall that is expansible and contractible along an axial direction and closed at opposite axial ends by respective closures, one of the respective closures comprising a part having an elliptical perimeter margin, and the axial end of the cylindrical wall that is closed by the one of the respective closures comprises a margin with which the perimeter margin of the part joins.

DETAILED DESCRIPTION

Figure 1:
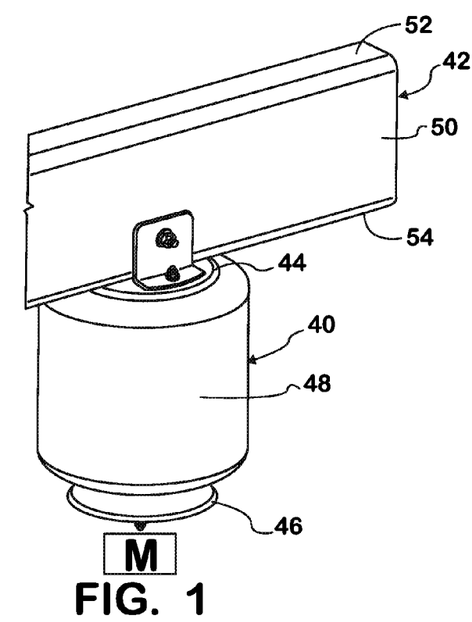
FIG. 1 is a perspective view of a pneumatic spring mounted on a chassis frame rail.

FIG. 1 shows a representative mounting of a pneumatic spring 40 on a chassis frame rail 42. Spring 40 comprises a top closure 44, a bottom closure 46, and a flexible cylindrical sleeve 48 whose opposite lengthwise ends are closed by the respective closures 44, 46.

Rail 42 comprises a vertical web 50 and inwardly turned top and bottom flanges 52, 54. A central portion of top closure 44 is fastened to bottom flange 54. A central portion of bottom closure 46 is fastened to a suspended vehicle component, such as an axle or bogie, containing wheels on which the vehicle travels, such component being depicted generically as an unsprung mass M.

Figure 5:
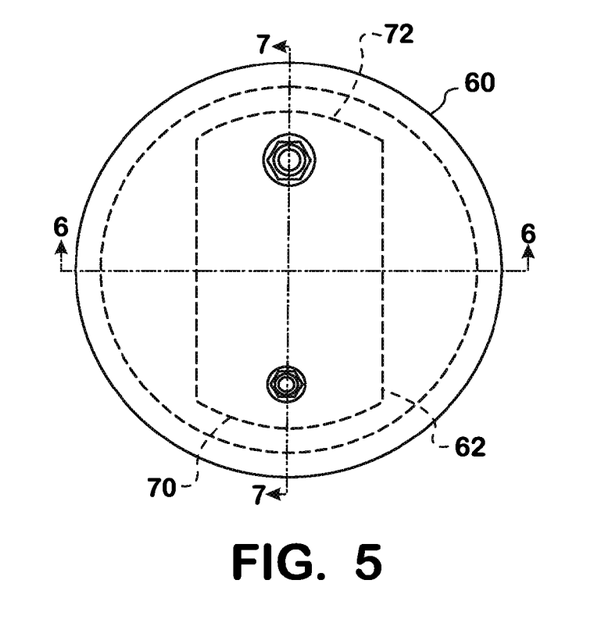
FIG. 5 is a top plan view of the formed reinforcement embodiment of top plate shown in FIG. 2.
Figure 6:
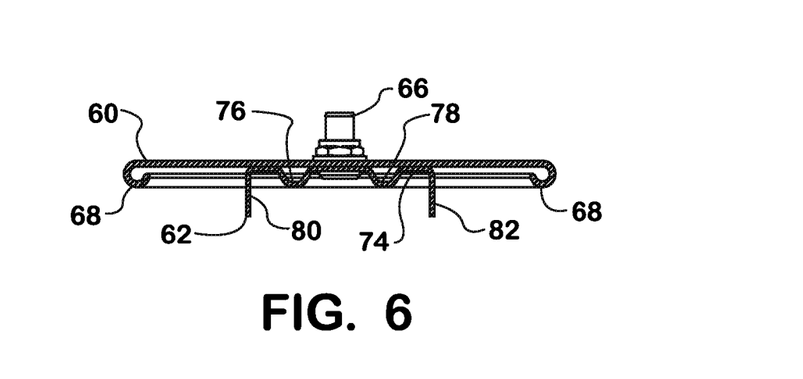
FIG. 6 is a cross section view taken in the direction of arrows 6-6 in FIG. 5.
Figure 7:
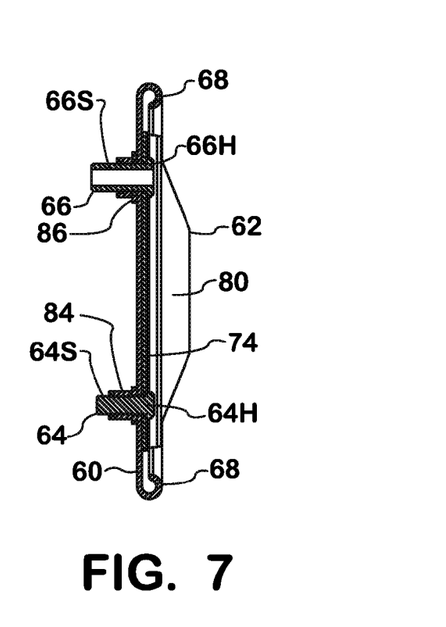
FIG. 7 is a cross section view taken in the direction of arrows 7-7 in FIG. 5.

FIGS. 5-7 disclose a formed reinforcement top closure of spring 40 that comprises a flat circular plate 60, a formed reinforcement bar 62, and fastening elements 64, 66. The outer perimeter of plate 60 comprises an endless curled lip 68 that is initially flat but is subsequently curled sufficiently to secure plate 60 to the top perimeter margin of sleeve 48 with fluid-tight sealing. The top perimeter margin of sleeve 48 typically has an internal bead encased in elastomeric material so that the curled lip entraps the encased bead while compressing elastomeric material surrounding the bead to provide the fluid-tight sealing.

Bar 62 has a length that along the middle of the bar's width lies on a diameter of plate 60 but that stops short of lip 68, ending at lengthwise ends in curved edges 70, 72 as shown in FIG. 5. Bar 62 comprises a top wall 74 whose top surface as viewed in FIG. 6 is disposed flat against the flat bottom surface of plate 60 but is interrupted by respective depressions 76, 78 running lengthwise of the bar to either side of the middle of the bar that lies on a diameter of the plate to corrugate top wall 74 so that the top surface of the wall comprises three separate, parallel zones. The widthwise margins of bar 62 comprise flanges 80, 82 that as shown in FIGS. 2 and 7, are turned downward from top wall 74 at a right angle and have narrowing tapers at their lengthwise ends.

Fastening element 64 comprises a head 64H and an externally threaded shank 64S. Head 64H is disposed against the inside of top wall 74 midway of the width of the bar near one lengthwise end. Shank 64S extends from head 64H through aligned through-holes in both top wall 74 and plate 60.

Fastening element 66 comprises a head 66H and an externally threaded shank 66S. Head 66H is disposed against the inside of top wall 74 midway of the width of the bar near the other lengthwise end. Shank 66S extends from head 66H through aligned through-holes in both top wall 74 and plate 60. Fastening element 66 is hollow to provide for a gas such as air to pass into and out of the interior of the spring.

Figure 2:
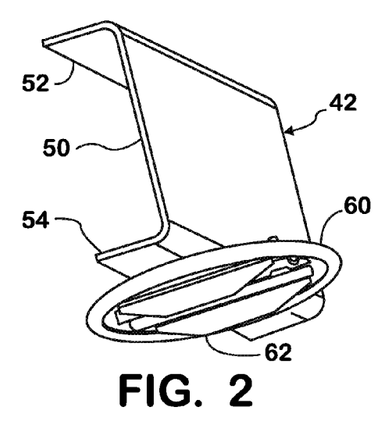
FIG. 2 is a perspective view of the chassis frame rail from a different direction showing a formed reinforcement embodiment of pneumatic spring top plate that is a subject of this disclosure attached to the rail.

FIG. 2 shows the formed reinforcement top closure disposed against the bottom surface of bottom flange 54 and fastened to that flange. Shanks 64S, 66S pass through respective holes in flange 54, and fasteners 84, 86 (FIGS. 5 and 7) are threaded onto shanks 64S, 66S and tightened. With the length of bar 62 arranged transverse to the length of rail 42 as in FIG. 2, increased rigidity is imparted to the portions of the closure that overhang inboard and outboard limits of flange 54.

FIGS. 8-15 disclose an arched plate top closure of spring 40 that comprises a circular arched plate 100 that is basically concave toward the interior of sleeve 48, fastening elements 102, 104, and a port element 106. The outer perimeter of plate 100 comprises a curled lip 108 that is curled sufficiently to secure plate 100 to the top perimeter margin of sleeve 48 with fluid-tight sealing in a manner similar to that described above for plate 60.

For increased rigidity beyond that provided by its arched shape alone, plate 100 has a generally rectangular depression 110 whose length at the middle of the depression's width lies on a diameter of plate 100 but stops short of lip 108. Depression 110 comprises a flat rectangular bottom wall 112 and side walls 114, 116, 118, 120 that incline upward from bottom wall 112 to merge with a downwardly concave zone 122 that is responsible for the arched, or domed, exterior appearance of plate 100 in spring 40. At its crest, zone 122 comprises a rectangular area 124 that is flat except at its corners near lip 108 where it blends with areas of zone 122 that form the concave shape by curving downwardly away.

Figures 8, 9:
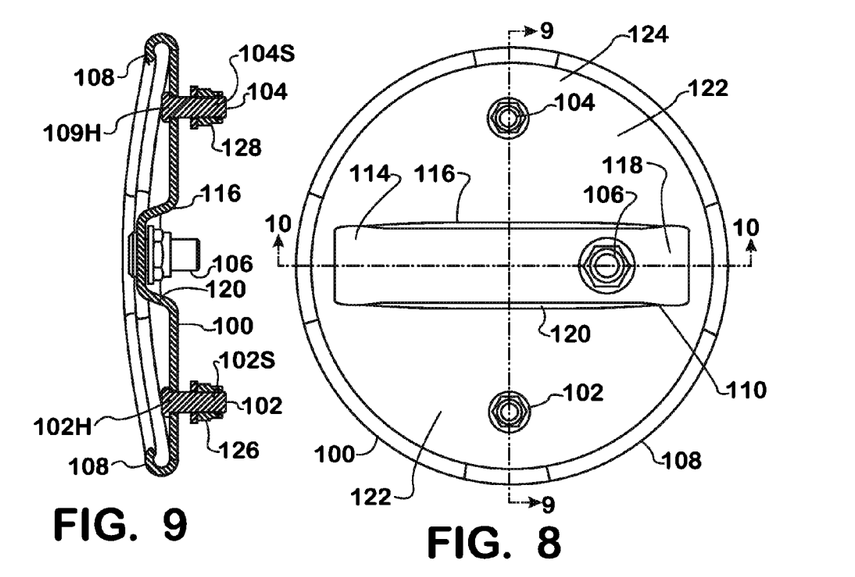
FIG. 8 is a top plan view of the arched embodiment of top plate shown in FIG. 3.
FIG. 9 is a cross section view taken in the direction of arrows 9-9 in FIG. 8.
Figures 10, 11:
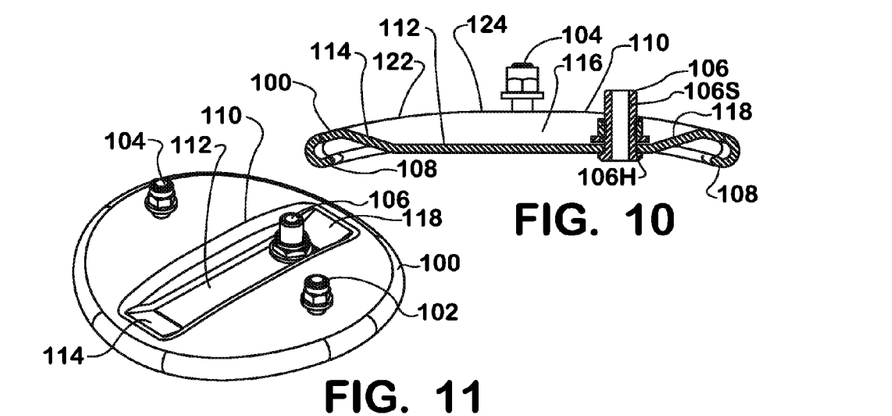
FIG. 10 is a cross section view taken in the direction of arrows 10-10 in FIG. 8.
FIG. 11 is a perspective view of the arched embodiment of top plate shown by itself.
Figure 12:
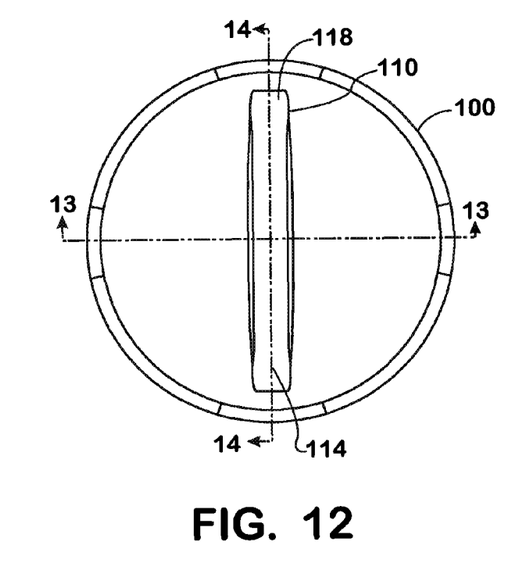
FIG. 12 is a top plan view of one part of the arched embodiment of top plate shown by itself.
Figure 13:
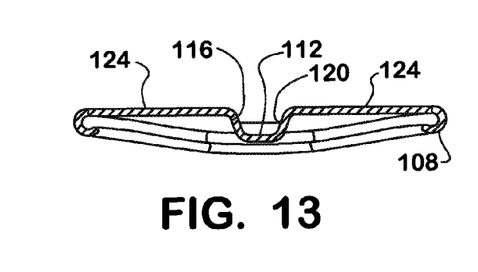
FIG. 13 is a cross section view taken in the direction of arrows 13-13 in FIG. 12.
Figure 14:
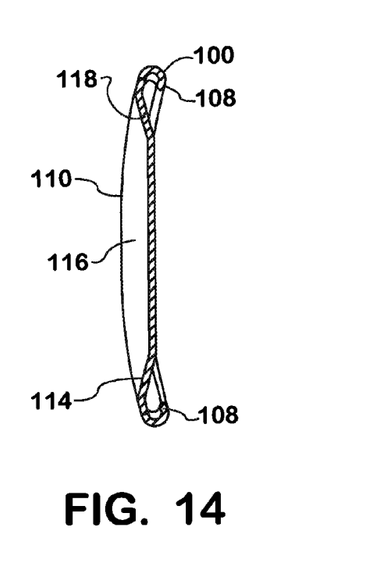
FIG. 14 is a cross section view taken in the direction of arrows 14-14 in FIG. 12.
Figure 15:
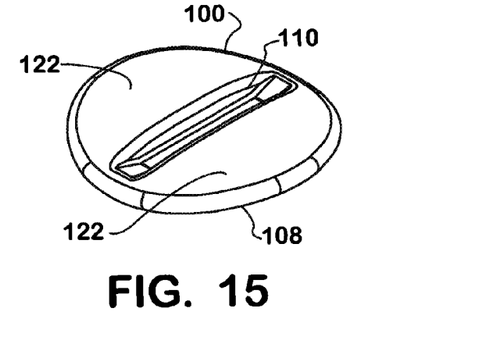
FIG. 15 is a perspective view of the part shown in FIGS. 12-14.

Fastening elements 102, 104, which are assembled to plate 100 prior to assembly of the plate to the sleeve, comprise respective heads 102H, 104H and externally threaded shanks 102S, 104S. Head 102H is disposed against the inside of plate 100 in area 124 midway of that area's width near one lengthwise end. Head 104H is disposed against the inside of plate 100 in area 124 midway of that area's width near the opposite lengthwise end. Shanks 102S, 104S extend from the respective heads through respective through-holes in plate 100.

Port element 106 comprises a head 106H disposed against the inside of bottom wall 112 near one lengthwise end and an externally threaded shank 106S passing through a through-hole midway of the width of wall 112. Port element 106, which is also assembled to plate 100 prior to assembly of the plate to the sleeve, is hollow to provide for a gas such as air to pass into and out of the interior of the spring.

Figure 3:
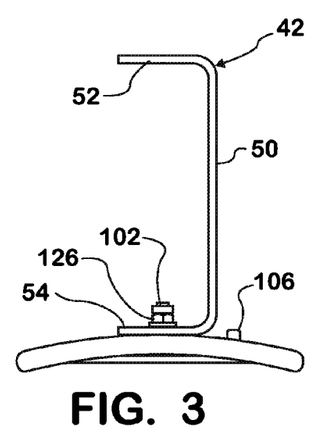
FIG. 3 is a view lengthwise of the chassis frame rail showing an arched embodiment of pneumatic spring top plate that is the subject of this disclosure.

FIG. 3 shows the arched top plate disposed against the bottom surface of bottom flange 54 and fastened to that flange. Shanks 104S, 106S pass through respective holes in flange 54, and fasteners 126, 128 (FIGS. 8 and 9) are threaded onto shanks 104S, 106S and tightened. While the general concave shape of the arched top plate provides rigidity, the inclusion of depression 110 provides even more. With the length of depression 110 arranged transverse to the length of rail 42 as in FIG. 3, increased rigidity is imparted to the portions of the closure that overhang inboard and outboard limits of flange 54. Port element 106 is present in FIG. 3, but not specifically shown.

FIGS. 12-15 show plate 100 by itself after it has been formed out of a metal, such as steel, by a metal forming process such as stamping. The perimeter margin is however shown having been curled instead of being flat as it would be after having been stamped but before assembly to sleeve 48.

FIGS. 16-23 disclose a circular domed clamshell top closure of spring 40 that comprises a formed outer circular plate 130 and a formed inner circular plate 132 that are cooperatively associated. While plate 130 is formed to be basically downwardly concave, it is formed to include features that interrupt its basically domed shape. One feature is a depression 134 similar to depression 110 in plate 100. Two additional features are elevated plateaus 136, 138, which are located centrally in respective halves of the dome that are separated by depression 134.

While plate 132 is formed to be basically slightly upwardly concave, it is formed to include a generally rectangular raised zone 140 whose shape approximately matches that of depression 134 so that when the two plates are assembled together to form the top closure of the spring, a top wall of raised zone 140 will abut the bottom wall of depression 134.

Figure 16:
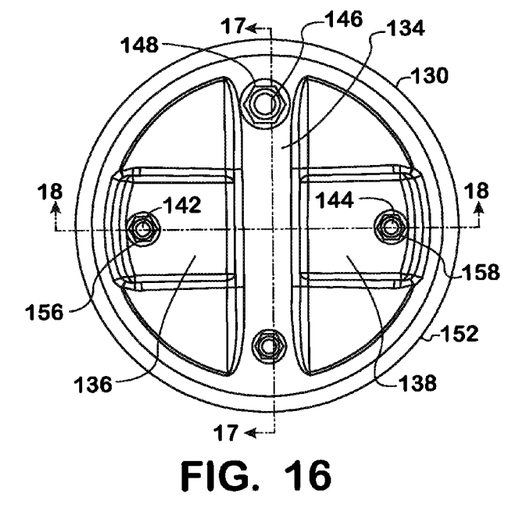
FIG. 16 is a top plan view of the domed clamshell embodiment of top plate shown in FIG. 4.
Figure 17:
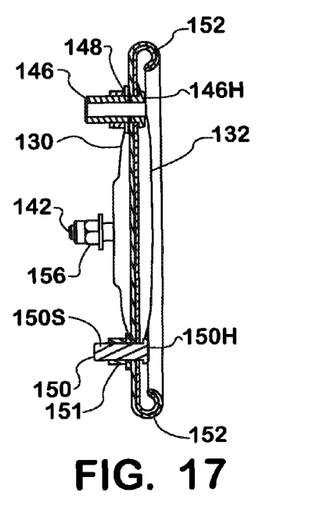
FIG. 17 is a cross section view taken in the direction of arrows 17-17 in FIG. 16.
Figure 18:
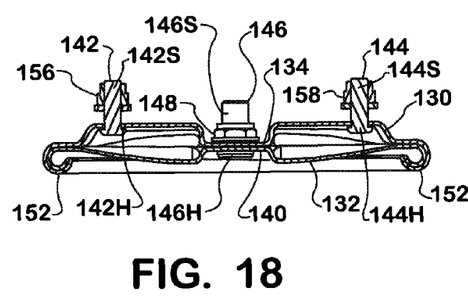
FIG. 18 is a cross section view taken in the direction of arrows 18-18 in FIG. 16.
Figure 19:
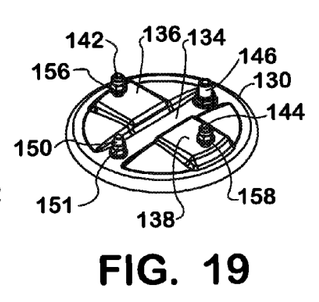
FIG. 19 is a perspective view of the domed clamshell embodiment of top plate shown by itself.
Figure 20:
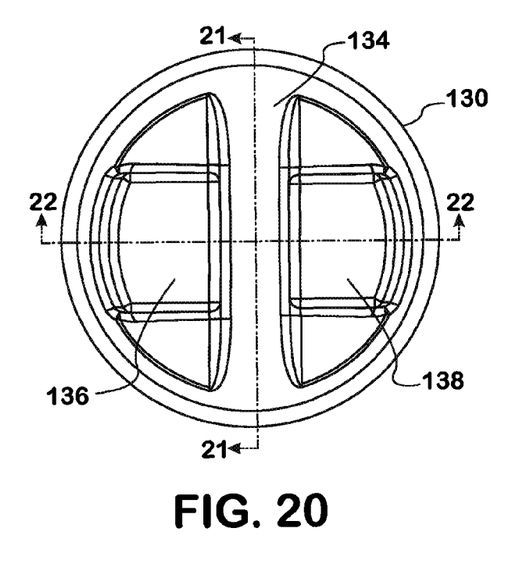
FIG. 20 is a top plan view of one part of the domed clamshell embodiment of top plate shown by itself.
Figure 21:
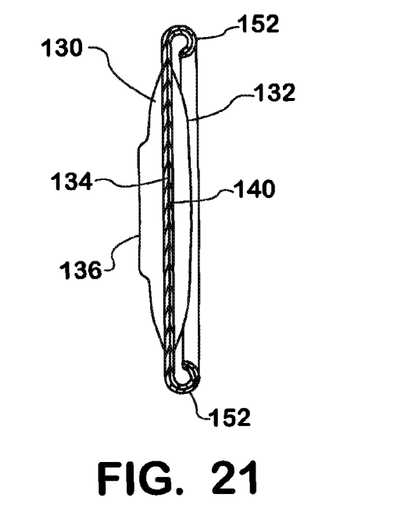
FIG. 21 is a cross section view taken in the direction of arrows 21-21 in FIG. 20.
Figure 22:
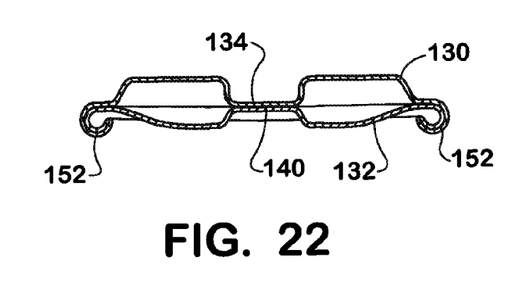
FIG. 22 is a cross section view taken in the direction of arrows 22-22 in FIG. 20.
Figure 23:
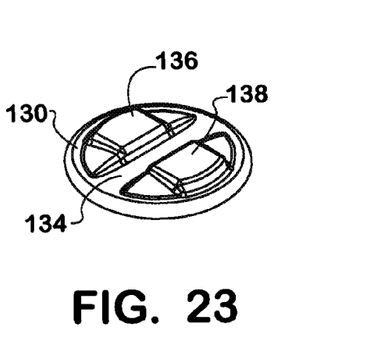
FIG. 23 is a perspective view of the part shown in FIGS. 20-22.

Prior to assembly of the two plates to each other, and while the outer perimeter margin of each is still flat and not yet formed to final shape, fastening elements 142, 144 are assembled to outer plate 130 so as to place their respective heads 142H, 144H against the inside of the plate 100 near respective lengthwise ends of elevated plateaus 136, 138 with their shanks 142S, 144S extending through through-holes in the plate.

The two plates are then placed together with their flat perimeter margins in mutual abutment and with the top wall of zone 140 and the bottom wall of depression 134 also in mutual abutment. A head 146H of a port element 146 is disposed against the bottom of the top wall of zone 140 with its threaded shank 146S passing through aligned through-holes in the top wall of zone 140 and the bottom wall of depression 134. A fastener 148 is threaded onto shank 146S and tightened. The head 150H of a fastening element 150 is placed against the inside of the top wall of raised zone 140 near the opposite lengthwise end from port element 146 with its shank 150S extending through aligned through-holes in the two plates. A threaded fastener 151 is shown threaded onto shank 150S. An auxiliary bracket (not shown) could be held secure on shank 150S via fastener 151 at fastened to the chassis frame to provide added support and/or allow the closure to be made of thinner gauge material.

Then the abutted perimeter margins of the two plates are curled to form a two-lamina curled lip 152 securing the domed clamshell closure to the top end of sleeve 48. Port element 146 is hollow to provide for a gas such as air to pass into and out of the interior of the spring.

Figure 4:
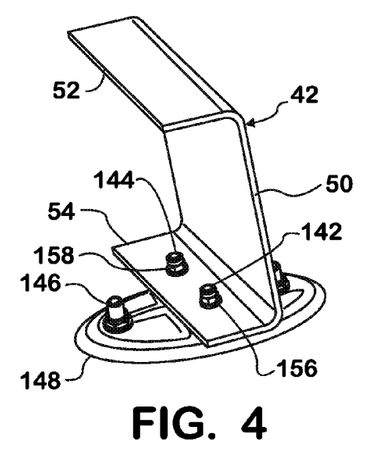
FIG. 4 is a perspective view of the chassis frame rail from still another direction showing a domed clamshell embodiment of pneumatic spring top plate that is the subject of this disclosure attached to the rail.

FIG. 4 shows the domed clamshell top closure disposed against the bottom surface of bottom flange 54 and fastened to that flange. Shanks 142S, 144S pass through respective holes in flange 54, and fasteners 156, 158 are threaded onto shanks 142S, 144S and tightened. Because the lengths of depression 134 and raised zone 140 are arranged transverse to the length of rail 42 as in FIG. 4, they, in conjunction with the two-plate domed structure, impart rigidity to the portions of the closure that overhang inboard and outboard limits of flange 54.

FIGS. 24-27 disclose an elliptical domed clamshell top closure that comprises a downwardly concave outer elliptical plate 160 and an upwardly concave inner elliptical plate 162 cooperatively associated. Plate 160 is formed to be nominally downwardly concave as viewed along both major and minor elliptical axes, however its formation includes an elevated plateau 164 having a length that at the middle of the plateau's width is centered on the major elliptical axis.

Figure 24:
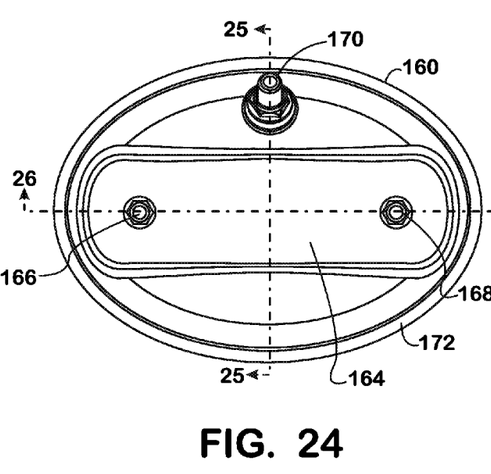
FIG. 24 is a top plan view of an elliptical clamshell embodiment of top plate.
Figure 25:
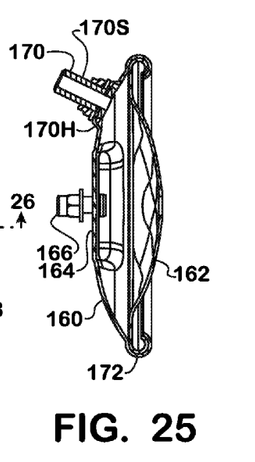
FIG. 25 is a cross section view taken in the direction of arrows 25-25 in FIG. 24.
Figure 26:
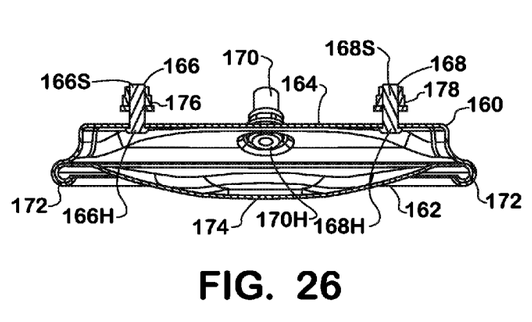
FIG. 26 is a cross section view taken in the direction of arrows 26-26 in FIG. 24.
Figure 27:
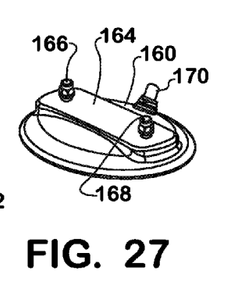
FIG. 27 is a perspective view of the elliptical clamshell embodiment of top plate shown by itself.

Prior to assembly of the two plates to each other, and while the outer perimeters of each are still flat and not yet formed to final shape, fastening elements 166, 168 are assembled to outer plate 160 so as to place their respective heads 166H, 168H against the inside of the plate 160 near respective lengthwise ends of the top wall of plateau 164 with their shanks 166S, 168S extending through respective through-holes in the plate. Then a head 170H of a hollow port element 170 is disposed against the domed portion of plate 160 to one side of plateau 164 and centered on the minor axis with its threaded shank 170S passing through a through-hole in plate 160.

The two plates 160, 162 are then placed together with their flat perimeter margins in mutual abutment. The abutted perimeter margins are then curled to form a two-lamina curled lip 172 securing them together as they cooperatively secure the closure to the top end of sleeve 48.

Port element 170 is hollow to provide for a gas such as air to pass into and out of the interior of the spring by passing through the space bounded by the plates and one or more through-holes, such as through-hole 174, in inner plate 162.

The elliptical domed clamshell top closure is disposed against the bottom surface of bottom flange 54 and fastened to that flange. Shanks 166S, 168S pass through respective holes in flange 54, and fasteners 176, 178 are threaded onto shanks 166S, 168S and tightened. The two-plate domed structure imparts rigidity to the portions of the closure that overhang inboard and outboard limits of flange 54.

FIGS. 28-31 disclose a flat elliptical top closure of spring 40 that comprises a flat elliptical plate 180 and fastening elements 182 and 184. The outer perimeter of plate 180 comprises an endless curled lip 186 that is curled sufficiently to secure plate 180 to the top perimeter margin of an elliptical sleeve 48 with fluid-tight sealing.

Figure 28:
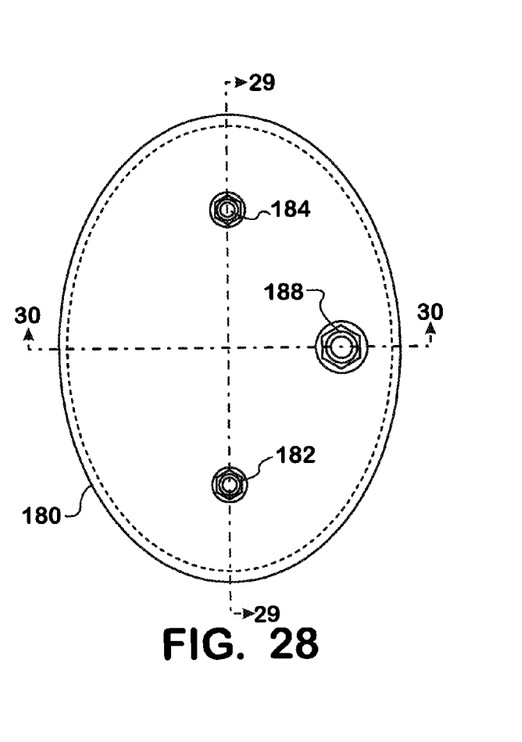
FIG. 28 is a top plan view of a flat elliptical embodiment of top plate.
Figure 29:
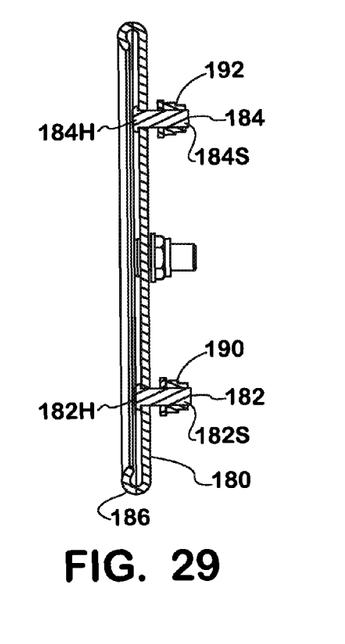
FIG. 29 is a cross section view taken in the direction of arrows 29-29 in FIG. 28.
Figure 30:
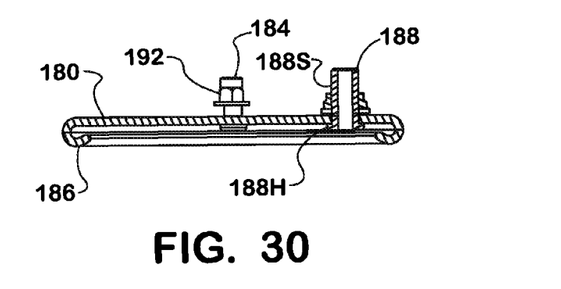
FIG. 30 is a cross section view taken in the direction of arrows 30-30 in FIG. 28.
Figure 31:
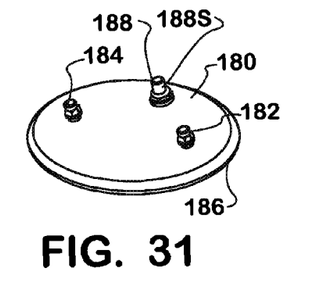
FIG. 31 is a perspective view of the flat elliptical embodiment of top plate shown by itself.

Fastening elements 182, 184 comprise respective heads 182H, 184H and externally threaded shanks 182S, 184S. Head 182H is disposed against the inside of plate 180 on the major axis near one lengthwise end with shank 182S extending through a through-hole in the plate. Head 184H is disposed against the inside of plate 180 on the major axis near the opposite lengthwise end with shank 184S extending through a through-hole in the plate.

A head 188H of a hollow port element 188 is disposed against the inside of plate 180 to one side of the major axis centered on the minor axis with its threaded shank 188S passing through a through-hole in the plate.

The flat elliptical top closure is disposed against the bottom surface of bottom flange 54 and fastened to that flange. Shanks 182S, 184S pass through respective holes in flange 54, and fasteners 190, 192 are threaded onto the respective shanks and tightened.

While the illustrated embodiments are disclosed as being fabricated from a formable material, such as a steel, that allows their perimeters to be curled for attachment to an end of a sleeve or bellows, the basic shapes may have other perimeter geometries for enabling attachment to an end of a sleeve or bellows. Some of the disclosed embodiments, such as those shown in FIGS. 2, 5-7 and FIGS. 4, 16-19, may avail themselves of the use of an auxiliary bracket (not shown) to attach to the chassis frame. In all embodiments, the attachment of the closure to the sleeve or bellows is properly sealed against air leakage, and any fasteners or vents passing through holes in a closure are also properly sealed to the closure.

What is claimed is:
1. A pneumatic spring comprising:
   a pneumatic chamber comprising a cylindrical wall which is expansible and contractible along an axial direction and which has opposite axial ends each closed by a respective closure, one of the closures comprising an outer circular plate and an inner reinforcement bar, the outer circular plate having a flat interior surface, the inner reinforcement bar having a length and a width and being disposed within the pneumatic chamber against the flat interior surface of the outer circular plate such that at a middle of the inner reinforcement bar's width the inner reinforcement bar's length lies on a diameter of the outer circular plate, the inner reinforcement bar being joined to the outer circular plate to endow the one closure with a moment of inertia along the diameter of the outer circular plate which is greater than that of the outer circular plate alone, the inner reinforcement bar's length stopping short of a perimeter of the outer circular plate, the inner reinforcement bar comprising a corrugated wall having a surface which is disposed flat against the flat interior surface of the outer circular plate and which comprises separate, parallel zones which are interrupted by depressions in the corrugated wall and which run lengthwise of the inner reinforcement bar to either side of the middle of the inner reinforcement bar's width.

2. The pneumatic spring as set forth in claim 1 in which the inner reinforcement bar comprises widthwise margins having flanges which extend lengthwise of the inner reinforcement bar and transversely away from the surface of the corrugated wall which is disposed flat against the flat interior surface of the outer circular plate.

3. The pneumatic spring as set forth in claim 2 in which the flanges have narrowing tapers at their lengthwise ends.

4. The pneumatic spring as set forth in claim 3 in which between their narrowing tapers, the flanges extend transversely farther away from the surface of the corrugated wall which is disposed flat against the flat interior surface of the outer circular plate than do the depressions.

5. The pneumatic spring as set forth in claim 1 including fastening elements which pass through aligned through-holes in the outer circular plate and in the corrugated wall, one of the fastening elements being hollow to provide for the pneumatic chamber to pneumatically communicate with a gas source.

6. The pneumatic spring as set forth in claim 1 further including a rail having a vertical web and a bottom flange to which a central portion of the one closure is fastened, and in which the rail has a length to which the length of the inner reinforcement bar is transverse, and the outer circular plate and the inner reinforcement bar overhang inboard and outboard limits of the bottom flange.

7. A pneumatic spring comprising:
a pneumatic chamber comprising a cylindrical wall which is expansible and contractible along an axial direction and which has opposite axial ends each closed by a respective closure, one of the closures comprising an outer circular plate and an inner reinforcement bar, the outer circular plate having a flat interior surface and the inner reinforcement bar having a length and a width which is smaller than the length, the inner reinforcement bar being disposed within the pneumatic chamber and comprising a corrugated wall having a surface which is interrupted by depressions and which is disposed flat against the flat interior surface of the outer circular plate such that at a middle of the inner reinforcement bar's width the inner reinforcement bar's length lies on a diameter of the outer circular plate, the inner reinforcement bar being joined to the outer circular plate to endow the one closure with a moment of inertia along the diameter of the outer circular plate which is greater than that of the outer circular plate alone, the inner reinforcement bar's length stopping short of a perimeter of the outer circular plate, the inner reinforcement bar comprising flanges which, at either side of the middle of the inner reinforcement bar's width, extend lengthwise of the inner reinforcement bar and transversely from widthwise margins of the corrugated wall.

8. The pneumatic spring as set forth in claim 7 in which the flanges have narrowing tapers at their lengthwise ends.

9. The pneumatic spring as set forth in claim 8 in which between their narrowing tapers, the flanges extend transversely farther away from the surface of the corrugated wall which is disposed flat against the flat interior surface of the outer circular plate than do the depressions.

10. The pneumatic spring as set forth in claim 7 including fastening elements which pass through aligned through-holes in the outer circular plate and in the corrugated wall, one of the fastening elements being hollow to provide for the pneumatic chamber to pneumatically communicate with a gas source.

11. The pneumatic spring as set forth in claim 7 further including a rail having a vertical web and a bottom flange to which a central portion of the one closure is fastened, and in which the rail has a length to which the length of the inner reinforcement bar is transverse, and the outer circular plate and the inner reinforcement bar overhang inboard and outboard limits of the bottom flange.

* * * * *